May 3, 1927.
E. J. PILBLAD
SPRING SUSPENSION DEVICE OR SHOCK ABSORBER
Filed April 21, 1924   2 Sheets-Sheet 1
1,626,966
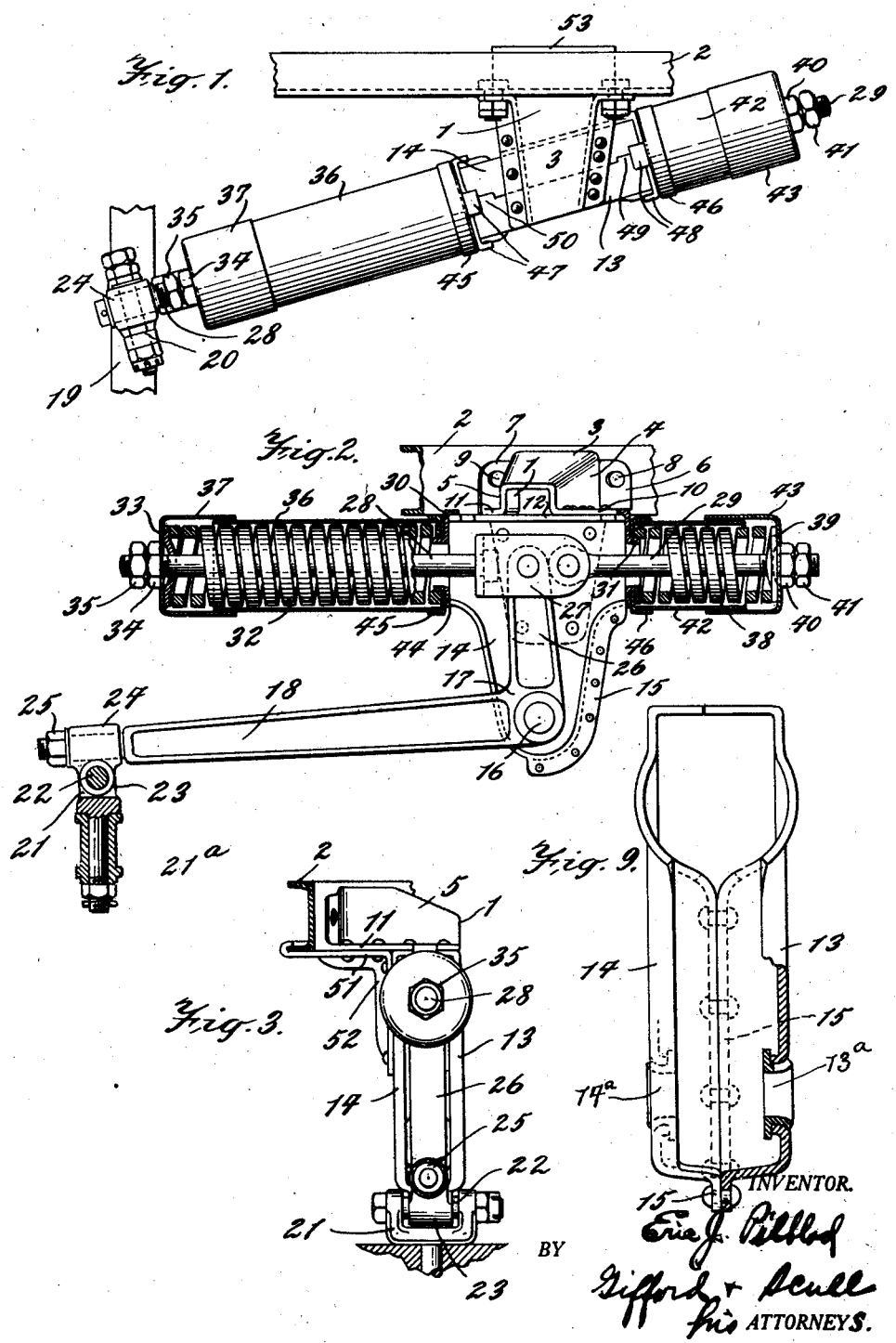

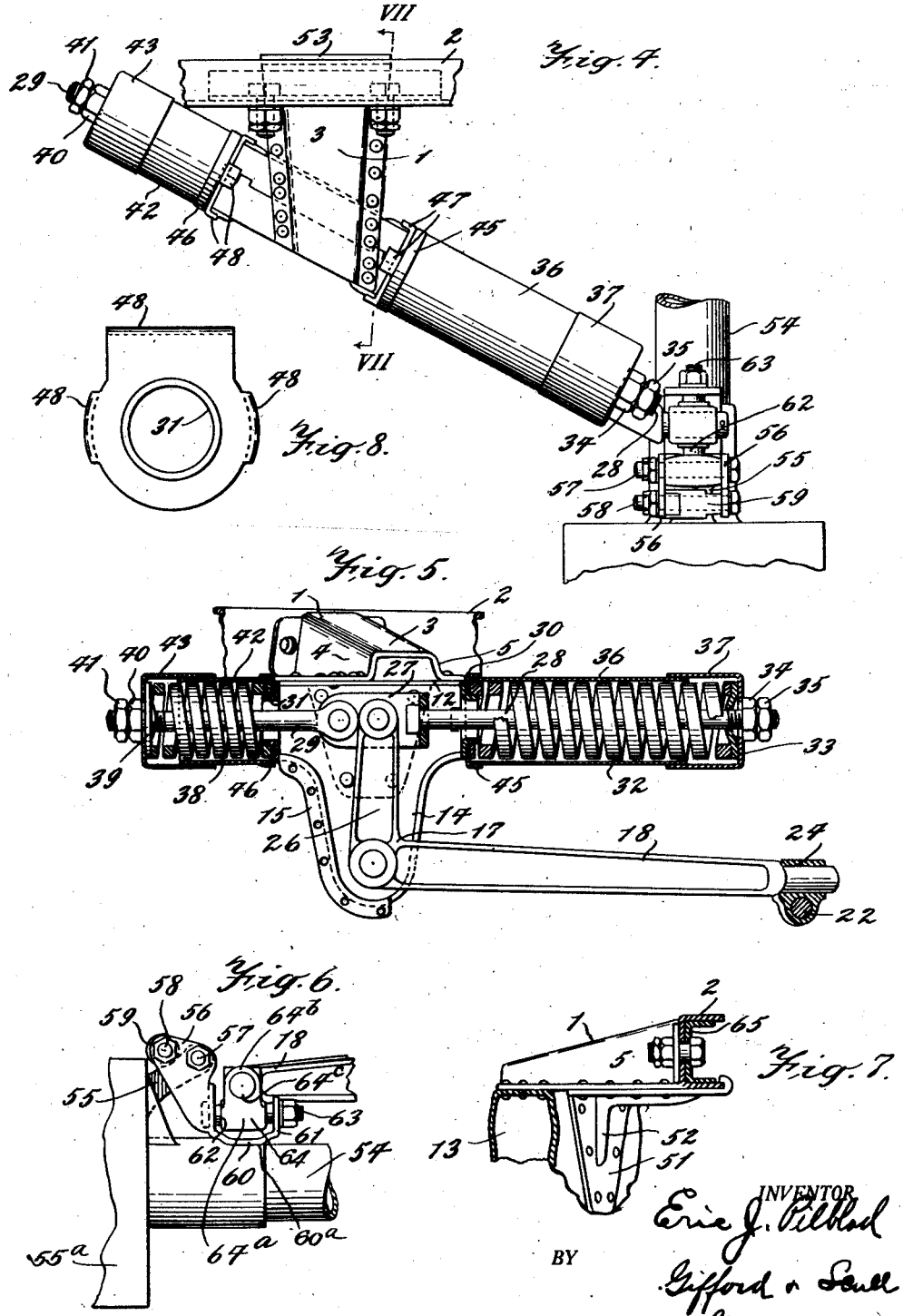

Patented May 3, 1927.

1,626,966

UNITED STATES PATENT OFFICE.

ERIC J. PILBLAD, OF BROOKLYN, NEW YORK, ASSIGNOR TO RUSSEL SUTHERLAND SMART, OF OTTAWA, CANADA.

SPRING-SUSPENSION DEVICE OR SHOCK ABSORBER.

Application filed April 21, 1924. Serial No. 707,820.

This invention relates to spring suspension devices and shock absorbers of the type in which the load is supported through the medium of spring held rocker arms, and the objects of the invention are generally to improve and simplify the construction of the device, and to adapt the various parts better to perform the functions required of them, and to enable them to be made of rugged construction at low cost.

More particular objects of the invention are to so dispose the operative elements and angular relationship thereof that they will be of maximum efficiency in resisting strain and avoiding tortional stress. Further objects still, are to enable the device to be rapidly manufactured by methods consistent with quantity production, and as far as possible, by the use of punch press work. Further objects still, are to facilitate the attachment of the device to any standard form of automobile or vehicle construction, and particularly to improve the form of supporting member or bracket by which the device is attached to the vehicle body or chassis. A still further object of the invention is to provide an improved form of connection between the rocker arm and wheel axle which will relieve tortional strain and prevent binding of the moving parts.

With these and other objects in view the invention consists essentially of the improved construction and arrangement of parts hereinafter more fully set forth and described in the accompanying specifications and drawings:

Fig. 1 is a plan view of one of the devices, showing a portion of the frame and a portion of the front axle of an automobile;

Fig. 2 is a side elevation of the device shown in Fig. 1, with certain parts in section;

Fig. 3 is a front elevation of the device shown in Figs. 1 and 2;

Fig. 4 is a plan view of one of my devices showing a portion of the vehicle frame and a portion of the rear axle;

Fig. 5 is a side elevation of the device shown in Fig. 4 with certain portions in section;

Fig. 6 is a detailed view of the means by which the device is attached to the rear axle;

Fig. 7 shows a section of the automobile frame and the supporting device on line 7—7 of Fig. 4, with certain of the parts broken away;

Fig. 8 shows one of the spring seats in end elevation; and

Fig. 9 shows an end view of the supporting member looking from the direction of the connection to the axle, certain parts being in section.

The devices shown in the drawings are designed particularly for use on the Ford automobile. The same general arrangement of course may be applied to other makes of automobiles, it being necessary to make only such detailed changes as the different designs necessitate. The arrangement of the drawings is for illustrative purposes and I desire it to be understood that I am not in any manner limited to the particular design as applicable to the Ford car.

In practice in order to secure the most desirable results, the spring suspension devices such as described herein will be provided for both front and rear axles of the vehicle, two suspension devices being provided for each axle. It will be apparent, however, that the suspension devices might be used on either axle separately or might under some circumstances be used singly and applied either in place of or as an auxiliary to the usual automobile springs whether of the leaf or other type.

Referring to the drawing, and particularly to the form illustrated in Figs. 1, 2 and 3, 1 indicates a bracket connected to the body of a vehicle, and to which a supporting member 12, is connected, the latter supporting a rocker arm, 17, the opposite end of which is connected to the axle 19, of the vehicle, the rocker arm 17, being retained in normal position by the supporting coil spring 32, and the rebound check spring 38.

In automobile construction, the wheel supporting axle usually extends a distance laterally on each side of the side frame or chassis and, while it is necessary that the spring suspension device should be supported from the side frame or chassis, it is also desirable that the point of connection between the device and the wheel should be as near the wheel as possible and thus be a distance laterally removed from the frame. It is found that the most effective support can be given to the axle by a spring suspension device having a supporting arm extending in a diagonal direction from the frame to the axle. To overcome tortional strain and to prevent binding on the bearings it is found desirable that such a member swing in a plane making an acute angle both with the frame and the axle of the vehicle to which it is attached, the axis of its bearings being at right angles to such plane. This is accomplished in the present embodiment by setting the supporting member 14 at an angle to the bracket 3 and by making the connection between the rocker arm 18 and the axle in the form of a universal joint 20, which permits the utmost freedom of movement to the rocker arm.

The bracket 3 by which the supporting member 12 is attached to the side frame 1 of the automobile is of special construction being reinforced longitudinally by a raised or arched portion 3, having sides 4 and 5. Flanges 6 and 7 are formed integrally with the sides 4 and 5 respectively, and are designed to be attached to the supporting member 12 by suitable means as by bolts or rivets passing through openings 8 and 9. The bracket 3 is also provided with flanges 10 and 11 which are connected as by rivets to the supporting member 12.

The supporting member 12 is also of special design, and for convenience in manufacture as well as in assembling, is formed in two parts 13 and 14 conveniently pressed from suitable sheet metal being flanged at 15 and united by rivets or other fastening means. The parts 13 and 14 are so shaped that when placed together a space is provided between them within which the rocker arm 17 is mounted, the shaft or pivot pin 16 of the rocker arm being journalled in the parts 13 and 14 and preferably in separate bearings 13$^a$ and 14$^a$ mounted in the side thereof. The rocker arm 17 is formed with a long arm 18 and a short arm 26, and is conveniently in the form of a bell crank lever, the latter construction enabling the supporting and rebound springs to extend in a horizontal direction and thus economize space.

The long arm 18 of the rocker arm 17 is attached to the axle 19 of the vehicle by any suitable means preferably by means such as 20 including a universal joint. As illustrated such means 20 consist of a shackle 21 supporting a pin or bolt 22 on which the knuckle member 23 is pivotally mounted.

The long arm 18 of the rocker arm 17 is journalled in the member 23 as by forming a cylindrical portion thereon which is journalled in the bearing 24 forming part of the member 23, the end of the arm 18 being releasably retained in position as by the nut 25 which engages with the screw threaded end on the cylindrical portion of the arm. The shackle 21 is suitably connected to the vehicle axle 19 as by the pin 21$^a$, extending through the axle. Inasmuch as the member 23 is free to turn about the pin 22 and as the axis of bearing 24 is set at right angles to the axis of the pin 22, the connection between the end of the arm 18 and the shackle 21 is in effect a universal joint. The axis of the pin 22 is set at slight angle to the axle 19 to thereby permit the rocker arm 17 to freely swing in the diagonal plane in which it is set.

The short end 26 of the rocker arm is operatively connected to the supporting spring 32 and the rebound check spring 38, such connection including a connector 27 pivotally attached to the arm 26 and connected to the springs by tie rods 28 and 29. The rod 28 may be in the form of an ordinary bolt passing through an opening in the connector or shackle 27. The rod 29 is in the form of an eye bolt, the eye of which is pivoted upon the pin 29$^a$ mounted in the connecting member and permitting free turning of the rod thereabout.

The supporting spring 32 and rebound check spring 38 are conveniently supported at their inner ends by spring seats 30 and 31 which may be made to serve in addition the purpose of holding the two parts 13 and 14 of the supporting member 12 together, this being accomplished by providing fingers or flanges 47 and 48 on the spring seats which embrace the said parts 13 and 14.

The supporting spring 32 is a coil spring designed to resiliently hold the rocker arm in normal position and constitute a spring support between the axle and frame. One end of the spring 32 bears against the spring seat 30 and the opposite end is connected to the rod 28 by suitable means such as the spring seat 30 held against the end of the spring 32 by nuts 34 and 35 which have screw threaded engagement with the extremity of the tie rod 28.

If desired, the spring may be protected from dust, weather, etc., by means of a cover 36, covering the spring 32 and having a cap member 37, held between the nut 34 and the spring seat 33, and being designed to telescope with the cover 36.

The rebound check spring 38 is also in the form of a coil spring, and surrounds the rod 29, being preferably of coarser pitch than the supporting or load carrying spring 32 but with fewer number of coils. One end of the rebound spring 38 bears against the spring seat 31, and the other end is operatively connected to the tie rod 29, as through the means of the spring seat 38, held in place by nuts 40 and 41 which have screw threaded engagement with the end of the rod 29. The cover 42 may also surround the spring 38 and have a cap 43 held between the nuts 40 and seat 39 and designed to telescope with the cover.

The spring seats 30 and 31 may conveniently be formed with flanges 45 and 46, extending around the covers 36 and 42 and designed to hold same in place, having a close fit therewith or being attached thereto.

The two members 13 and 14 of the supporting member 12 are preferably pivoted in a plane which is the same as, or parallel to, the plane in which the rocker arm 12 swings, and to more effectively prevent any relative displacement they are designed to interlock, this being accomplished by providing tongues 49 and 50 on the member 13, which fit into suitable notches on the member 14, as shown in Fig. 1. This arrangement, together with the rivets or other fastening means passing through the flanges of the members 13 and 14 serve to hold them effectively together and to adapt supporting member to resist the various strains to which it is subjected in use.

Additional strength may be given both to the bracket 1 and to the supporting member 12 by means of a brace member 51, which connects both of said members with the frame member 2, being conveniently riveted to the flanges 10, and 11 of the bracket 1 and to the side of the part 14 of the member 12. The brace member 51 is preferably reinforced, as by the rib 52, which gives additional strength and rigidity thereto.

The brace member 51 is of angular form extending beneath the frame member 2 and being conveniently attached thereto by having its end portion 53 curved upwardly in a hooked form to engage the web of the frame channel. It will be found that by this construction a support is provided which is relatively light and strong and which is durable and efficent in operation.

It will be noted that the bracket 1 extends substantially horizontally over the supporting member 12 which latter extends substantially vertically but at a slight angle to the frame member 2 so that the extremity of the arm 18 of the rocker arm 17 may be attached to the axle at a point substantially outside the area of the frame thereby giving a wider supporting position to the vehicle body and adding to the stability thereof. The axis of the pivot pin 16 for the rocker arm 17 is substantially at right angles to the plane in which the rocker arm swings thereby eliminating side strain from the bearings, and reducing very considerably the wear thereon.

The arrangements shown in Figs. 4 and 5 which are those for the rear axle, are substantially the same as shown in Figs. 1 and 2 respectively and the corresponding parts bear corresponding numbers. In Figs. 4 and 5 the device is shown as attached to the rear axle 54 of a Ford automobile.

The means for attaching the arm 18 of the rocker arm 17 to the axle is shown in detail in Fig. 6. Such means include a lug or supporting bracket 55 conveniently mounted on the usual brake drum 55$^a$ and pivotally connected to the connecting member 56 which is connected by a universal joint 64 with the arm 18.

It is desirable to provide adjustable means for holding the connecting member 56 rigidly in position to avoid pounding or rattling. The means I have devised to accomplish this include a bolt or pin 58 extending through and journalled in the member 56 and carrying an eccentric sleeve 59 designed to engage the lug 55 and turn the member 56 in a clockwise direction around the pivot pin 57 thus pressing the portion 60 of the member 56 firmly downwardly against the axle 54, lateral play being conveniently prevented by side flanges 60$^a$ which engage opposite sides of the axle 54.

The universal joint 64 includes the pivot pin 63 journalled in upturned portions 61 and 62 of the member 56 and mounted in the bearing 64$^a$ on the universal joint member 64 which bearing 64$^a$ extends at right angles to the bearing 64$^b$ which journals the cylindrical extension 64$^c$ which forms the extremity of the arm 18 of the rocker arm 17.

The universal joint 64 includes the pivot pin 63 journalled in upturned portions 61 and 62 of the member 56 and mounted in the bearing 64$^a$ on the universal joint member 64 which bearing 64$^a$ extends at right angles to the bearing 64$^b$ which journals the cylindrical extension 64$^c$ which forms the extremity of the arm 18 of the rocker arm 17.

By reason of the arrangement shown in Fig. 6 the member 56 is held rigidly against the axle and all pounding is avoided thus eliminating the injury which might result if there should be even a slight amount of movement between the member 56 and the axle 54. It is further possible by this arrangement to adjust readily the member 56 to provide against wear, the eccentric sleeve 59 after being adjusted to the desired position, being locked in position by tightening the end nut on the bolt 58.

Owing to the greater weight which is supported by the suspension devices which are connected to the rear axle it is usually found convenient to reinforce the frame channel by means such as the reinforcing member 65, conveniently also in the form of a channel (see Fig. 7).

From the foregoing it will be noted that my invention has many advantages, among which may be mentioned that a support of great rigidity, lightness, ruggedness, and durability is provided by properly forming and fastening together pieces of sheet steel which may be easily stamped to the required shape; the support may be easily applied to new or old vehicles by the simple expedient of two bolts or rivets passing through the support and web of the frame channel; all side strain is removed from the pivot pin and its bearing, thus eliminating the greater portion of wear in service and making it possible to use elements of lighter construction than would otherwise be possible; by placing the levers at an angle to the side frames a wider base of support is secured without the production of unnecessary side strain on the pivot pins, thus adding to the security of the body support; covers are provided for both the load-carrying and rebound check springs and means provided whereby the covers telescope with each other to protect the springs at all times.

My invention also has other advantages resulting from the combination of the elements shown and described which advantages will be apparent to those skilled in the art.

What I claim is:

1. A spring suspension device of the character described comprising in combination, a support designed to be connected to the frame of the vehicle, a rocker arm pivotally supported thereby having two arms, one of which is adapted to be connected to the axle of a vehicle and to swing in a plane making an acute angle both with the frame and the axle of the vehicle to which it is attached, a coil spring operatively connected to the other arm of the rocker arm and acting to resiliently hold the same in normal position.

2. A spring suspension device of the character described comprising in combination, a support designed to be connected to the frame of a vehicle, a rocker arm pivotally supported thereby having two arms, one of which is adapted to be connected to the axle of a vehicle and to swing in a plane making an acute angle both with the frame and the axle of the vehicle to which it is attached and coil springs operatively connected to opposite sides of the other arm of the rocker arm and acting to resiliently hold the same in normal position and to prevent rebound when moved therefrom.

3. A spring suspension device of the character described comprising in combination, a support designed to be connected to the frame of a vehicle, a rocker arm pivotally supported thereby having two arms, one of which is adapted to be connected to the axle of a vehicle and to swing in a plane making an acute angle both with the frame and the axle of the vehicle to which it is attached, a coil spring operatively connected to the other arm of the rocker arm and acting to resiliently hold the same in normal position, and a universal joint fastening device connected to the extremity of that arm of the rocker arm which is to be connected to the axle of the vehicle.

4. A spring suspension device of the character described comprising in combination, a support designed to be connected to the frame of a vehicle, a rocker arm pivotally supported thereby having two arms, one of which is adapted to be connected to the axle of a vehicle and to swing in a plane making an acute angle both with the frame and the axle of the vehicle to which it is attached and coil springs operatively connected to opposite sides of the other arm of the rocker arm and acting to resiliently hold the same in normal position and to prevent rebound when moved therefrom, the said coil springs being of different strength.

5. A spring suspension device of the character described, a bracket designed to be secured to the body of the vehicle, a two part supporting member supported therefrom, a rocker arm pivotally mounted on the supporting member, connecting means including a coil spring extending between one arm of the rocker arm and the supporting member, the other arm of the rocker arm being designed to be connected to the axle of the vehicle, and a spring seat engaging the spring and holding the two parts of the supporting member together.

6. In a spring suspension device having a supporting rocker arm and coil spring connected thereto, a supporting member formed in two parts, and spring seating means adapted to seat the spring and to hold the parts together.

7. In a spring suspension device a bracket, a supporting member connected to the bracket and being formed in two parts, a rocker arm pivoted to the supporting member, springs connected to opposite sides of the rocker arm, a spring seating connection connected to the means adapted to hold two parts of the supporting member together.

8. In a spring suspension device having a supporting rocker arm and coil spring connected thereto a supporting member formed in two parts, spring seating means adapted to hold the parts together, and bearings in each part of said supporting member.

9. In a spring suspension device having a rocker arm and coil spring connected thereto, a supporting member comprising two hollow flanged parts, fastening means connecting the flanges, and spring seating means embracing both parts.

10. In a spring suspension device of the character described, a horizontally extending arched bracket and a vertically extending supporting member connected thereto.

11. In a suspension device of the character described, a horizontally extending arched and flanged bracket and a vertically extending supporting member connected thereto.

12. In a spring suspension device of the character described, a horizontally extending flanged bracket and a two part vertically extending flanged supporting member connected to the flanges on the bracket.

13. A spring suspension device of the character described comprising, a bracket designed to be secured to the frame of a vehicle and to extend outwardly therefrom, a supporting member angularly set with respect to the bracket and secured thereto, a rocker arm pivotally mounted on the supporting member and a coil spring extending between the rocker arm and the supporting member.

16. In a spring suspension device of the character described, connecting means comprising an arched bracket designed to extend on one side of a frame member, and an angular brace member connected to the bracket and having means to embrace opposite sides of the aforesaid frame member.

15. In a spring suspension device of the character described connecting means comprising, a bracket designed to extend on one side of the frame member, and an angular brace member connected to the bracket having means to embrace the opposite side of the frame member.

16. In a spring suspension device of the character described supporting means comprising, a supporting member, a bracket designed to be secured to one side of a frame member and connected to said supporting member, an angular brace member connected both to the said bracket and to the said supporting member and having means to embrace the opposite side of the frame member to that embraced by the bracket.

17. A spring suspension device of the character described comprising in combination, a support designed to be connected to the frame of a vehicle, a rocker arm pivotally supported thereby having two arms, one of which is adapted to be connected to the axle of a vehicle and to swing in a plane making an acute angle both with the frame and the axle of the vehicle to which is it attached, a coil spring operatively connected to the other arm of the rocker arm and acting to resiliently hold the same in normal position and a telescoping cover inclosing said spring.

18. A support for automobile spring suspension devices comprising, a longitudinally arched member having flanges some of which are adapted to be fastened to a vehicle frame, a second member fastened to flange on the first member, said second member being arranged transversely of the first member and extending downwardly therefrom.

19. A support for automobile spring suspension devices, comprising, a longitudinally arched member having flanges some of which are adapted to be fastened to a vehicle frame, a second member fastened to flange on the first member, said second member being arranged transversely of the first member and extending downwardly therefrom and a bearing in the lower portion of said second member.

20. A support for automobile spring suspension devices comprising, a longitudinally arched member having flanges some of which are adapted to be fastened to a vehicle frame, a second member fastened to flange on the first member, said second member being arranged transversely of the first member and extending downwardly therefrom and a brace member fastened to said member and attached to engage the frame of the vehicle.

21. In a device of the character described, a spring held rocker arm and a connection for the same, including a universal joint, a connecting member operatively connected thereto, a bracket pivoted to the connecting member and means for adjusting the position of the connecting member with respect to the bracket.

22. In a device of the character described, connecting means comprising a universal joint, a connecting member operatively connected thereto, having one end designed to abut the axle of the vehicle a fixed bracket connected to the opposite end of the connecting member, and a pivoted eccentric on the connecting member designed to bear against the bracket.

23. A device as claimed in claim 34, in which the connecting member is formed with flanges designed to embrace a vehicle axle.

24. In a spring suspension device and in combination, a frame, an axle projecting laterally outwardly from each side of the frame, and spring held rocker arms extending diagonally from the sides of the frame to the axle, and adapted to swing in a plane making an acute angle both with the axle and the frame.

ERIC J. PILBLAD.